| (12) | United States Patent | (10) Patent No.: US 12,241,668 B2 |
|---|---|---|
| | Haraguchi | (45) Date of Patent: Mar. 4, 2025 |

(54) HEAT MANAGEMENT SYSTEM

(71) Applicant: SANDEN CORPORATION, Isesaki (JP)

(72) Inventor: Tomonori Haraguchi, Isesaki (JP)

(73) Assignee: SANDEN CORPORATION, Isesaki (JP)

( * ) Notice: Subject to any disclaimer, the term of this patent is extended or adjusted under 35 U.S.C. 154(b) by 151 days.

(21) Appl. No.: 18/043,601

(22) PCT Filed: Aug. 24, 2021

(86) PCT No.: PCT/JP2021/030903
§ 371 (c)(1),
(2) Date: Mar. 1, 2023

(87) PCT Pub. No.: WO2022/064930
PCT Pub. Date: Mar. 31, 2022

(65) Prior Publication Data
US 2023/0349606 A1    Nov. 2, 2023

(30) Foreign Application Priority Data

Sep. 23, 2020  (JP) .................................. 2020-158973

(51) Int. Cl.
*F25B 41/42* (2021.01)
*B60H 1/00* (2006.01)
(Continued)

(52) U.S. Cl.
CPC ......... *F25B 41/42* (2021.01); *B60H 1/00885* (2013.01); *B60H 1/32284* (2019.05);
(Continued)

(58) Field of Classification Search
CPC ............ B60H 1/00885; B60H 1/32284; B60K 11/02; B60K 1/00; B60K 2001/003;
(Continued)

(56) References Cited

U.S. PATENT DOCUMENTS 9,561,704 B2 *   2/2017  Enomoto ............... B60K 11/02
9,791,194 B2 *  10/2017  Takayama ............... F25B 49/02
(Continued)

FOREIGN PATENT DOCUMENTS

DE    112018004238 T5 *   5/2020  ......... B60H 1/00278
EP         2781854 A1 *   9/2014  ............. F25B 13/00
(Continued)

OTHER PUBLICATIONS

Japan Patent Office, Notice of Reasons for Refusal issued in Japanese Patent Application No. 2020-158973, dated Jan. 29, 2024 (8 pages).
International Search Report mailed Nov. 9, 2021 for International Application No. PCT/JP2021/030903.

*Primary Examiner* — Ljiljana V. Ciric
(74) *Attorney, Agent, or Firm* — Baker Botts L.L.P.

(57) ABSTRACT

A heat management system includes: a refrigerant circuit; a high-temperature heat medium circuit through which heat medium is heated to a high temperature by heat released from the refrigerant, and circulated; a low-temperature heat medium circuit through which heat medium is cooled to a low temperature by absorbing heat into the refrigerant, and circulated; a temperature adjustment heat exchanger to adjust a temperature of a heat management subject; a heat medium mixer connected to an upstream side of the temperature adjustment heat exchanger to mix high-temperature heat medium and low-temperature heat medium at a ratio depending on a target temperature of the heat management subject; and a branch connected to a downstream side of the temperature adjustment heat exchanger to return the heat medium having gone through the temperature adjustment heat exchanger to the high-temperature heat medium circuit and the low-temperature heat medium circuit.

2 Claims, 7 Drawing Sheets

(51) Int. Cl.
*B60H 1/32* (2006.01)
*B60K 1/00* (2006.01)
*B60K 11/02* (2006.01)
*F25B 25/00* (2006.01)
*F25B 29/00* (2006.01)

(52) U.S. Cl.
CPC ............ *B60K 11/02* (2013.01); *F25B 25/005* (2013.01); *F25B 29/003* (2013.01); *B60K 1/00* (2013.01); *B60K 2001/003* (2013.01); *B60K 2001/005* (2013.01); *B60K 2001/006* (2013.01); *F25B 2339/047* (2013.01)

(58) Field of Classification Search
CPC ........ B60K 2001/005; B60K 2001/006; F25B 41/42; F25B 25/005; F25B 29/003; F25B 2339/047
See application file for complete search history.

(56) References Cited

U.S. PATENT DOCUMENTS

| | | | |
|---|---|---|---|
| 11,299,014 B2* | 4/2022 | Kato | B60H 1/32284 |
| 11,358,438 B2* | 6/2022 | Dong | B60H 1/00007 |
| 2020/0198443 A1* | 6/2020 | Kato | B60H 1/00278 |
| 2021/0008951 A1* | 1/2021 | Aikawa | B60H 1/3205 |
| 2023/0349606 A1* | 11/2023 | Haraguchi | B60K 11/02 |
| 2024/0270050 A1* | 8/2024 | Shimizu | F25B 6/04 |

FOREIGN PATENT DOCUMENTS

| | | | |
|---|---|---|---|
| EP | 2781854 B1 * | 7/2019 | ............. F25B 13/00 |
| JP | 2014-000948 A | 1/2014 | |
| JP | 2015-140093 A | 8/2015 | |
| JP | 2018-043741 A | 3/2018 | |
| JP | 2019-055704 A | 4/2019 | |
| JP | 2020-105942 A | 7/2020 | |

* cited by examiner

HEAT MANAGEMENT SYSTEM

TECHNICAL FIELD

The present invention relates to a heat management system suitable for an electric vehicle.

BACKGROUND ART

A heat management system employed in an electric vehicle includes a heat medium (water) circuit to cool a battery, a traction electric motor, an inverter, and so forth. With this heat medium circuit, the heat medium receives heat from a heat management subject such as a battery via a heat exchanger, and releases the heat to the outside of the vehicle while passing through an air heat exchanger (radiator) (see Patent Literature 1 mentioned below).

In addition, a heat exchange is performed between an air conditioning refrigerant circuit and the heat medium circuit to cool the battery whose temperature becomes higher during the driving, and the heat is absorbed in the refrigerant circuit to lower the temperature of the heat medium to cool the battery (see Patent Literature 2 mentioned below).

CITATION LIST

Patent Literature

PTL1: Japanese Patent Application Laid-Open No. 2020-105942
PTL2: Japanese Patent Application Laid-Open No. 2018-43741

SUMMARY OF INVENTION

Problem to be Solved by the Invention

The heat management of vehicle parts in the electric vehicle needs not only to cool the parts but also adjust their temperature to an appropriate range of temperatures in some cases. For the temperature adjustment of the battery, the optimum temperature is about 25 degrees Celsius, and when the outdoor temperature is low, the heat medium is heated by an electric heater and flowed to a heat exchanger for the battery. This worsens the energy use efficiency, and causes a problem of increasing energy consumption.

To address this, it has been discussed that the heat medium is heated by using a heat pump for the heating. However, the blowing temperature required for the heating is about 40 to 60 degrees Celsius, which is different from the optimum temperature (about 25 degrees Celsius) of the battery. Therefore, when the heat medium for adjusting the temperature of the battery is simply heated with the heat pump used for the heating, a problem of excessively increasing the temperature of the battery occurs. In addition, for heat management subjects other than the battery, it is required to perform the temperature adjustment in various temperature ranges depending on circumstances. Here, there is a problem that it is not possible to set an appropriate temperature range only by heating the heat medium with the heat pump.

The present invention has been achieved in consideration of the circumstances, and it is therefore an object of the invention to improve energy use efficiency, reduce power consumption, and perform temperature adjustment of a heat management subject in a desired temperature range.

Solution to Problem

To solve the above-described problem, the invention provides a heat management system including: a refrigerant circuit through which a refrigerant is circulated; a high-temperature heat medium circuit through which heat medium pumped from a first pump is heated to a high temperature by heat released from the refrigerant, and circulated; a low-temperature heat medium circuit through which heat medium pumped from a second pump is cooled to a low temperature by absorbing heat into the refrigerant, and circulated; a temperature adjustment heat exchanger configured to adjust a temperature of a heat management subject; a heat medium mixer connected to an upstream side of the temperature adjustment heat exchanger, and configured to mix high-temperature heat medium for the high-temperature heat medium circuit and low-temperature heat medium for the low-temperature heat medium circuit at a ratio depending on a target temperature of the heat management subject; and a branch connected to a downstream side of the temperature adjustment heat exchanger, and configured to return the heat medium having gone through the temperature adjustment heat exchanger to the high-temperature heat medium circuit and the low-temperature heat medium circuit.

Effect of the Invention

The heat management system with the above-described features can improve the energy use efficiency, reduce the power consumption, and perform the temperature adjustment of a heat management subject in a desired temperature range.

DESCRIPTION OF EMBODIMENTS

Hereinafter, an embodiment of the invention will be described with reference to the drawings. In the description below, the same reference number in different drawings denotes the same component with the same function, and duplicate description for each of the drawings is omitted accordingly.

Figure 1:
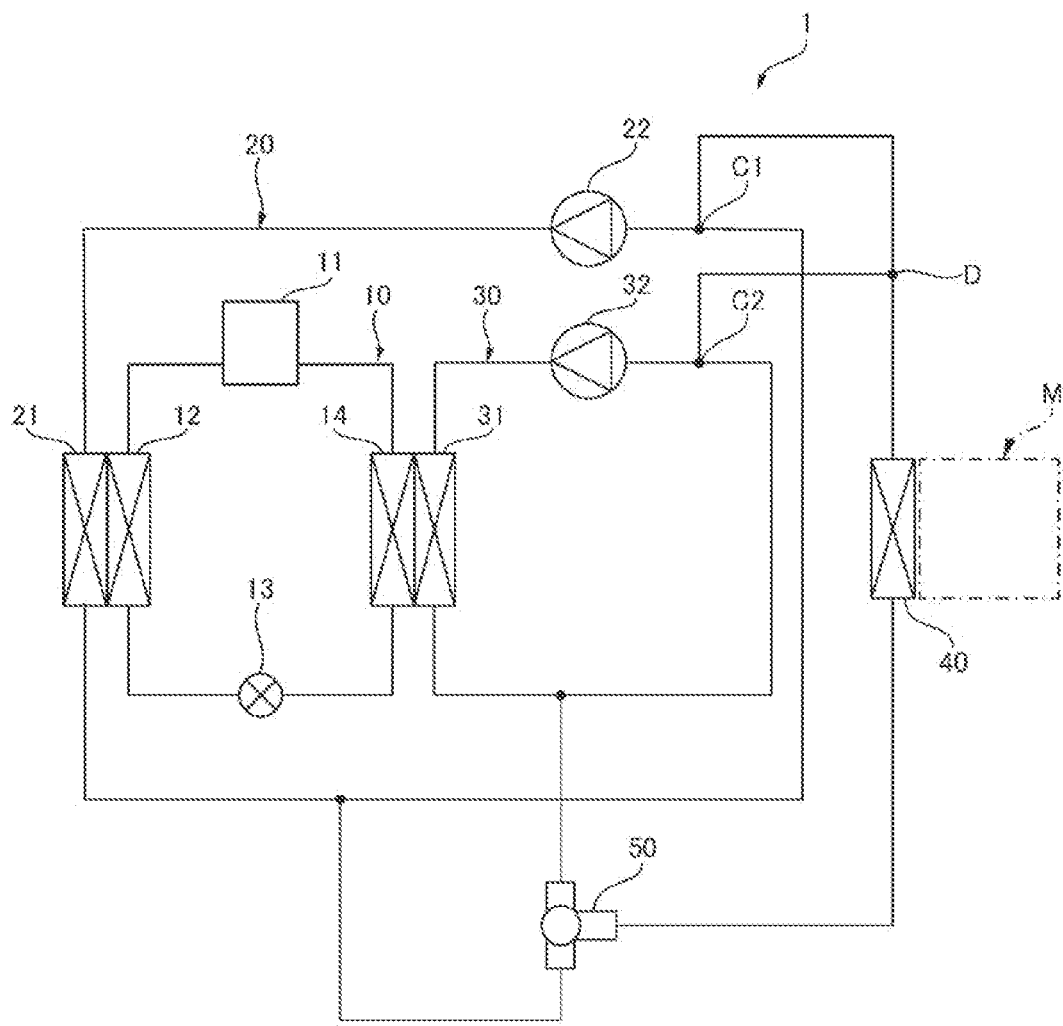
FIG. 1 illustrates the basic configuration of a heat management system according to an embodiment of the invention.

As illustrated in FIG. 1, a heat management system 1 according to an embodiment of the invention includes a refrigerant circuit 10, a high-temperature heat medium circuit 20, and a low-temperature heat medium circuit 30. The refrigerant circuit 10 configured to circulate a refrigerant therethrough is a closed circuit in which a compressor 11, a condenser 12, an expansion valve 13, and an evaporator 14 are connected in sequence with refrigerant pipes. However, this is by no means limiting, but the refrigerant circuit 10 may include, for example, an accumulator upstream of the compressor 11.

The high-temperature heat medium circuit 20 includes a high-temperature heat exchanger 21 integrated with the condenser 12 of the refrigerant circuit 10 and configured to perform a heat exchange between the heat medium and the refrigerant. While passing through the high-temperature heat exchanger 21, the heat medium pumped from a first pump 22 is heated to a high temperature by the heat released from the refrigerant in the condenser 12 of the refrigerant circuit 10, and circulated.

The low-temperature heat medium circuit 30 includes a low-temperature heat exchanger 31 integrated with the evaporator 14 of the refrigerant circuit 10 and configured to perform a heat exchange between the heat medium and the refrigerant. While passing through the low-temperature heat exchanger 31, the heat medium pumped from a second pump 32 is cooled to a low-temperature by absorbing the heat into the refrigerant in the evaporator 14 of the refrigerant circuit 10, and circulated.

As the heat medium for the high-temperature heat medium circuit 20 and the lower-temperature heat medium circuit 30, water without additives, or water containing additives such as nonfreezing agent and antiseptic agent, and liquid heat medium such as oil may be adopted.

Moreover, the heat management system 1 includes a temperature adjustment heat exchanger 40 configured to adjust the temperature of a heat management subject M such as a battery of an electric vehicle. A heat medium mixer 50 is connected to an upstream side of the temperature adjustment heat exchanger 40, and a branch D is connected to a downstream side of the temperature adjustment heat exchanger 40.

The heat medium mixer 50 is configured to mix the high-temperature heat medium for the high-temperature heat medium circuit 20 and the low-temperature heat medium for the low-temperature heat medium circuit 30 at a ratio depending on a target temperature of the heat management subject M. The heat medium mixer 50 is configured as a flow rate control valve whose mixing ratio is controlled by a control unit (not shown).

The branch D is a branching path configured to return the heat medium having gone through the temperature adjustment heat exchanger 40 to the high-temperature heat medium circuit 20 and the low-temperature heat medium circuit 30. The branch D is connected to the high-temperature heat medium circuit 20 by a first connector C1 upstream of the first pump 22, and is connected to the low-temperature heat medium circuit 30 by a second connector C2 upstream of the second pump 32.

This heat management system 1 can adjust the temperature of the heat management subject M by utilizing the heat release and the heat absorption of the heat pumps. Therefore, it is possible to improve the energy use efficiency and reduce the power consumption, compared to a case in which an electric heater is provided separately. In addition, the high-temperature heat medium for the high-temperature heat medium circuit 20 and the low-temperature heat medium for the low-temperature heat medium circuit 30 are mixed at a desired ratio, and supplied to the temperature adjustment heat exchanger 40. By this means, it is possible to adjust the temperature of the heat management subject M in an optional temperature range depending on the target temperature of the heat management subject M.

The heat medium having gone through the temperature adjustment heat exchanger 40 is branched at the branch D, returns from the first connector C1 to the high-temperature heat medium circuit 20, and returns from the second connector C2 to the low-temperature heat medium circuit 30. In this case, any valve for setting the branching ratio is not especially provided, but the heat medium is returned just depending on the mixing ratio set by the heat medium mixer 50. By this means, it is possible to perform the temperature adjustment in a desired temperature range with low power consumption, while simplifying the configuration of the heat medium circuit.

A specific configuration example of the heat management system 1 will be described with reference to FIG. 2. Here, various parts and air conditioning devices of an electric vehicle are subjects for the heat management. As vehicle parts which are heat management subjects, a battery M1, an inverter M2, and a motor M3 are illustrated, and as air conditioning devices which are heat management subjects, a main air conditioning unit M4 configured to perform air conditioning for the vehicle compartment space, and individual air conditioning units M5 and M6 provided in seats and configured to perform air conditioning for passengers. Temperature heat exchangers 41, 42, 43, 44, 45, 46, and 47 are attached to those heat management subjects and configured to be able to perform heat exchanges with the heat management subjects.

Figure 2:
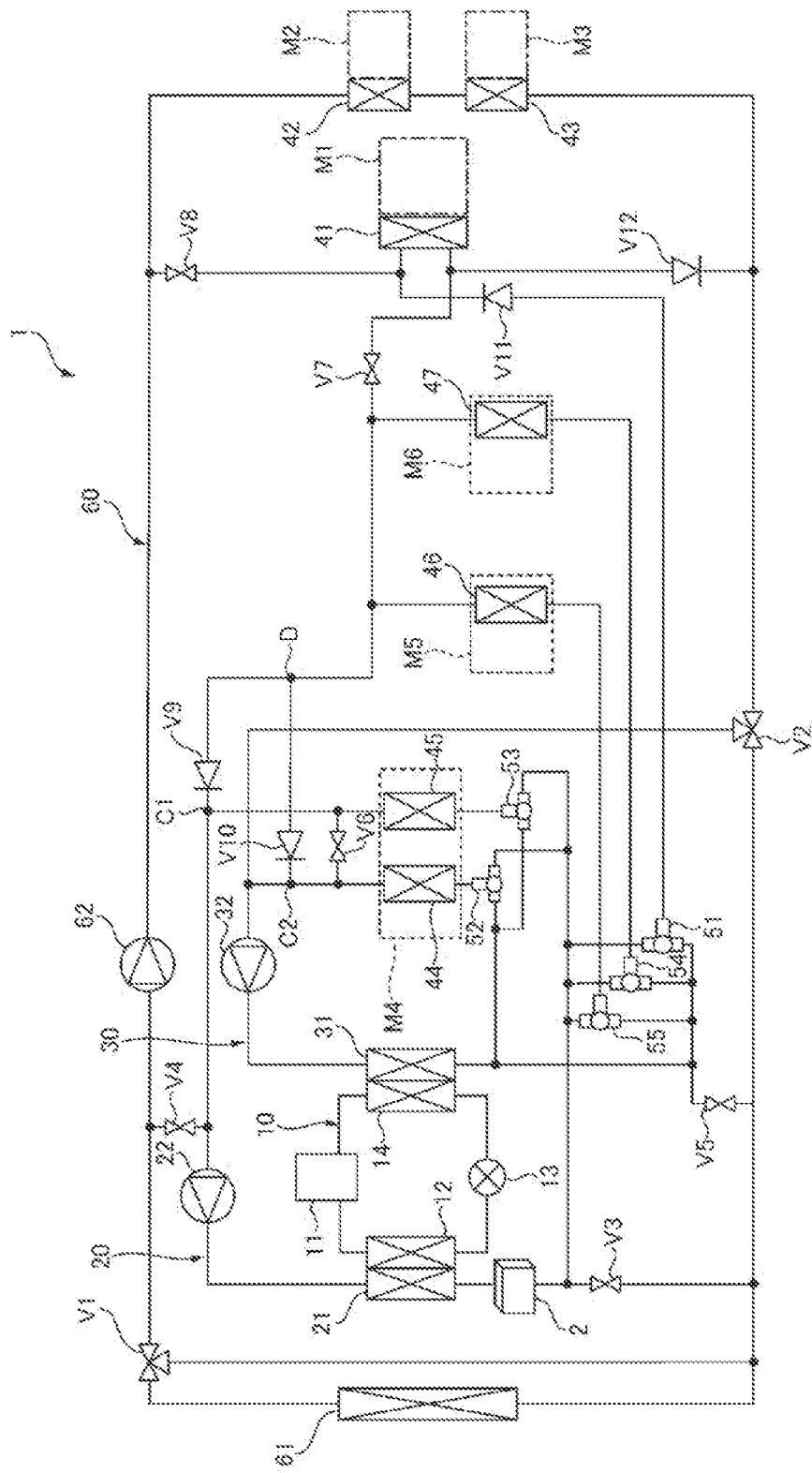
FIG. 2 illustrates a specific configuration example of the heat management system according to an embodiment of the invention.

The heat management system 1 illustrated in FIG. 2 includes the refrigerant circuit 10, the high-temperature heat medium circuit 20, and the low-temperature heat medium circuit 30 as described above. Heat medium mixer 51, 52, 53, 55, and 54 are connected to the upstream sides of the temperature adjustment heat exchangers 41, 44, 45, 46, and 47, respectively. The heat medium mixers 51, 52, 53, 55, and 54 mix the high-temperature heat medium for the high-temperature heat medium circuit 20 and the low-temperature heat medium for the low-temperature heat medium circuit 30 at mixing ratios depending on target temperatures. The heat mediums mixed at the mixing ratios and having the adjusted temperatures are supplied to the temperature adjustment heat exchangers 41, 44, 45, 46, and 47, respectively. Meanwhile, the temperature adjustment heat exchangers 42 and 43 without target temperatures are connected to an air-cooling heat medium circuit 60 including an air heat exchanger (radiator) 61 and a third pump 62. As a configuration example of the heat management system 1, an electric heater 2 may be additionally provided.

The high-temperature heat medium circuit 20, the low-temperature heat medium circuit 30, and the air-cooling heat medium circuit 60 are connected to predetermined flow paths via valves V1 to V12, respectively. Here, the valves V1 and V2 are three-way valves capable of selectively switching among flow paths in three directions, and the valves V3, V4, V5, V6, V7 and V8 are two-way valves capable of opening and closing the flow paths. In addition, the valves V9, V10, and V11 are check valves to stop the reverse flow of the flow paths.

The branch D is provided in the flow path downstream of the temperature adjustment heat exchangers 41, 46, and 47 configured to perform temperature adjustment by setting the target temperatures. The branch D is connected to the upstream side of the first pump 22 in the high-temperature heat medium circuit 20 by the first connector C1, and is connected to the upstream side of the second pump 32 in the low-temperature heat medium circuit 30 by the second connector C2.

Hereinafter, examples of operation modes of the heat management system 1 will be described. FIG. 3 to FIG. 7 illustrate circuit conditions in the operation modes of the heat management system 1. Here, the high-temperature heat medium flows through flow paths indicated by double lines, the low-temperature heat medium flows through flow paths indicated by bold lines, and the mixed heat medium of the high-temperature heat medium and the low-temperature heat medium or heat medium subjected to a heat exchange with air flows through flow paths indicated by normal solid lines. Flow paths indicated by broken lines are not used by selecting the flow paths with the valves V1 and V2, or optionally selecting the opening and closing of the valves V3 to V8.

Figure 3:
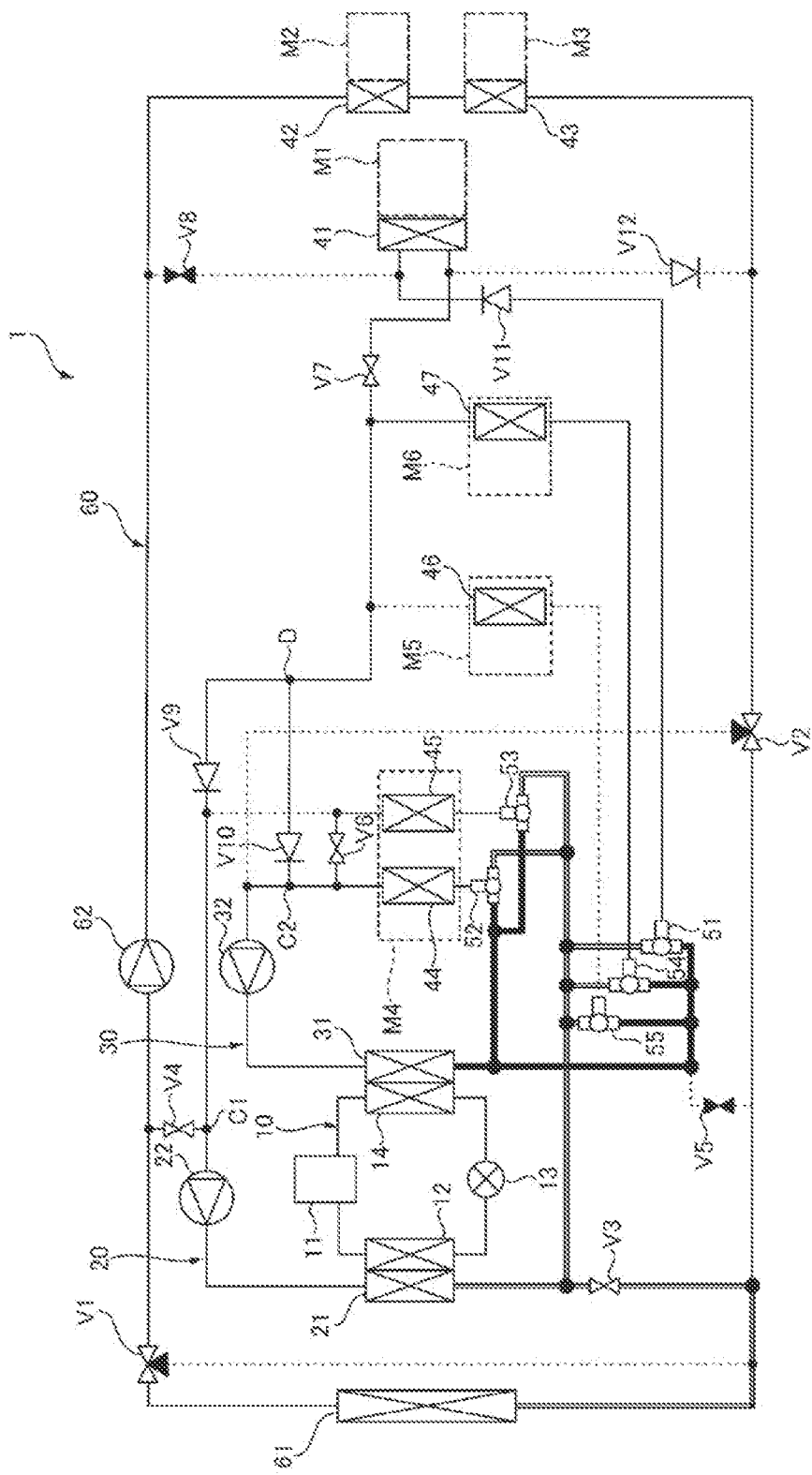
FIG. 3 illustrates an example of operation modes of the heat management system.

The circuit condition illustrated in FIG. 3 indicates an operation mode to perform the cooling by the air conditioning devices and to cool the battery M1.

In this example, the high-temperature heat medium having gone through the high-temperature heat exchanger 21 is fed to an inlet provided in one side of each of the heat medium mixers 51 to 55. In addition, the high-temperature heat medium having gone through the high-temperature heat exchanger 21 is branched upstream of the valve V3 to the air heat exchanger 61. In this case, the high-temperature heat medium circuit 20 is a circulation circuit configured to allow the heat medium from the first pump 22 to pass through the high-temperature heat exchanger 21, the valve V3, the air heat exchanger 61, the valves V1 and V4 in sequence.

Meanwhile, the low-temperature heat medium having gone through the low-temperature heat exchanger 31 is fed to an inlet provided in one side of each of the heat medium mixers 51 to 55. The low-temperature heat medium circuit 30 is a circulation circuit configured to allow the heat medium from the second pump 32 to pass through the low-temperature heat exchanger 31, the heat medium mixers 52 and 53, the temperature adjustment heat exchangers 44 and 45, and the valve V6 in sequence.

Then, the heat medium mixed by the heat medium mixer 51 and adjusted to a preset temperature is fed to the temperature adjustment heat exchanger 41 for the battery M1 via the valve 11 to adjust the temperature of the battery M1 to the target temperature. The heat medium having gone through the temperature adjustment heat exchanger 41 goes through the valve V7, is blanched at the branch D. One of the branched heat mediums returns from the first connector C1 to the high-temperature heat medium circuit 20, and the other returns from the second connector C2 to the low-temperature heat medium circuit 30.

In addition, the heat medium mixed by the heat medium mixer 54 and adjusted to a preset temperature is fed to the temperature adjustment heat exchanger 47 for the individual air conditioning unit M6 to adjust the temperature of the individual air conditioning unit M6 to the target temperature. The heat medium having gone through the temperature heat exchanger 47 meets the heat medium having gone through the temperature adjustment heat exchanger 41, is branched at the branch D. One of the branched heat mediums returns from the first connector C1 to the high-temperature heat medium circuit 20, and the other returns from the second connector C2 to the low-temperature heat medium circuit 30.

Moreover, the heat mediums mixed by the heat medium mixers 52 and 53 and adjusted to preset temperatures are fed to the temperature adjustment heat exchangers 44 and 45 for the main air conditioning unit M4, respectively. Each of the temperature adjustment heat exchangers 44 and 45 functions as a cooler core which can set temperatures, and is configured as an air conditioning device for the cooling.

Figure 4:
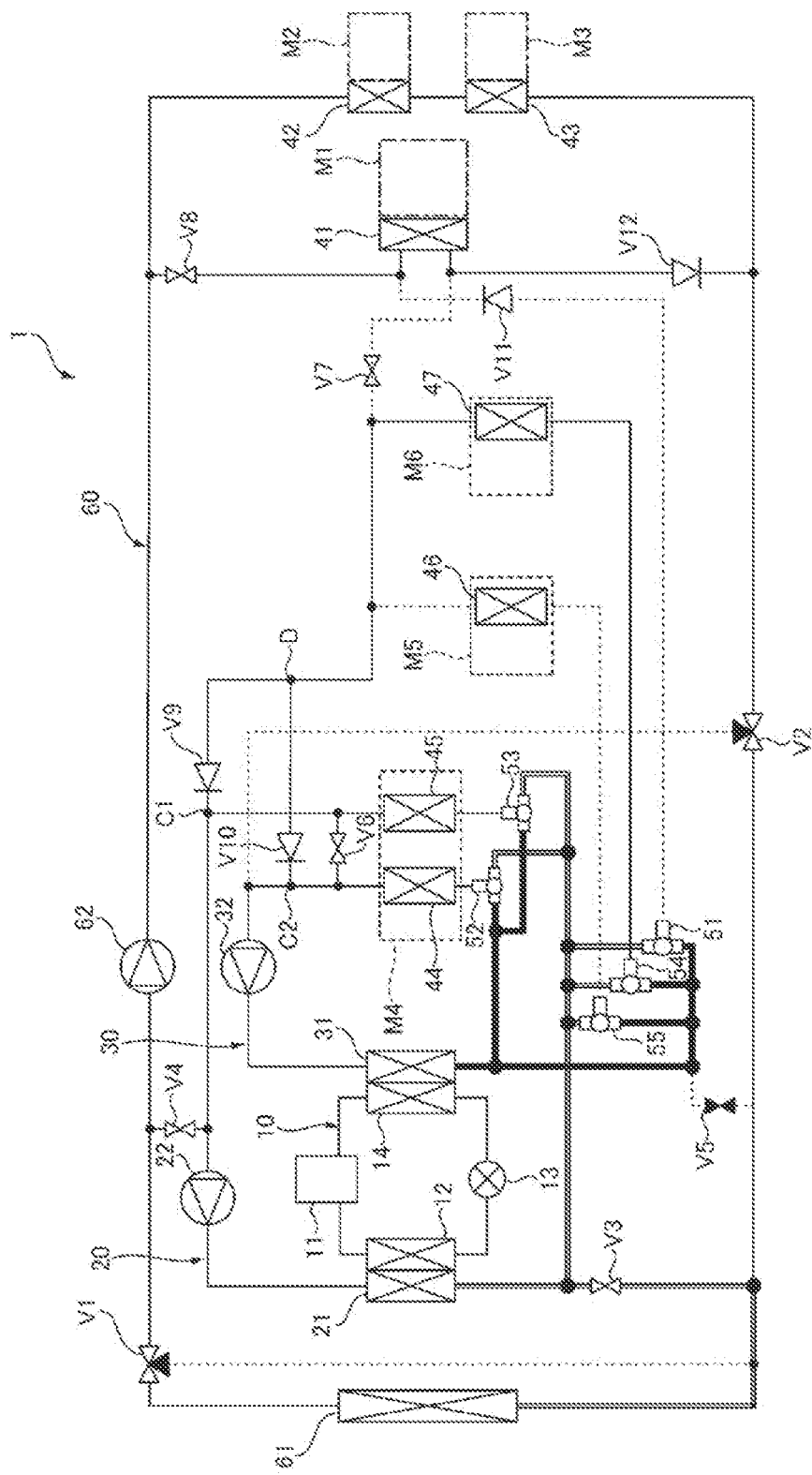
FIG. 4 illustrates an example of operation modes of the heat management system.

The circuit condition illustrated in FIG. 4 indicates an operation mode in which the air conditioning device for the main air conditioning unit M4 is constituted by a cooler core and a heater core, and the battery M1 is cooled by the heat medium flowing through the air-cooling heat medium circuit 60.

In this example, the temperature adjustment heat exchanger 44 which is one of the temperature adjustment heat exchangers for the main air conditioning unit M4 functions as the cooler core, and the temperature adjustment heat exchanger 45, which is the other, functions as the heater core. In this case, in addition to the circulation circuit configured to allow the heat medium from the first pump 22 to pass through the high-temperature heat exchanger 21, the valve V3, the air heat exchanger 61, and the valves V1 and V4 in sequence, the high-temperature heat medium circuit 20 includes a circuit configured to allow the heat medium from the high-temperature heat exchanger 21 to go through the heat medium mixer 53, and the temperature adjustment heat exchanger 45 functioning as the heater core, and return to the first pump 22.

Also in this example, the heat medium mixed by the heat medium mixer 54 and adjusted to a preset temperature is fed to the temperature adjustment heat exchanger 47 for the individual air conditioning unit M6 to adjust the temperature of the individual air conditioning unit M6 to the target temperature. The heat medium having gone through the temperature adjustment heat exchanger 47 is branched at the branch D. One of the branched heat mediums returns from the first connector C1 to the high-temperature heat medium circuit 20, and the other returns from the second connector C2 to the low-temperature heat medium circuit 30.

In this example, the temperature adjustment heat exchanger 41 for the battery M1, the temperature adjustment heat exchanger 42 for the inverter M2, and the temperature adjustment heat exchanger 43 for the motor M3 are connected to the air-cooling heat medium circuit 60 in parallel with each other.

Figure 5:
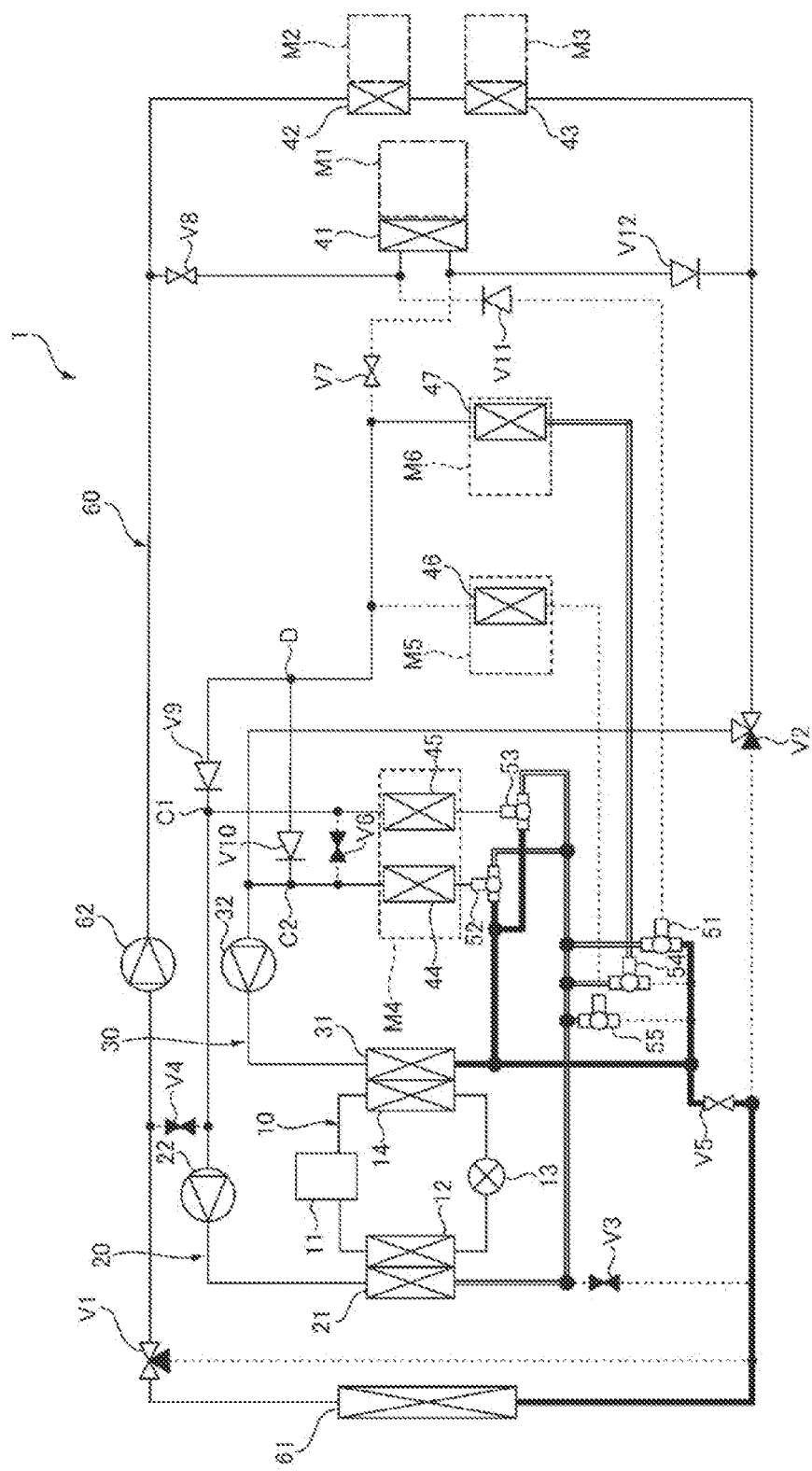
FIG. 5 illustrates an example of operation modes of the heat management system.

The circuit condition illustrated in FIG. 5 indicates an operation mode to perform the heating and dehumidifying.

In this example, the temperature adjustment heat exchanger 44 which is one of the temperature adjustment heat exchangers for the main air conditioning unit M4 functions as the cooler core, and the temperature adjustment heat exchanger 45, which is the other, functions as the heater core in the same way as the example illustrated in FIG. 4. The high-temperature heat medium circuit 20 is configured to allow the heat medium from the first pump 22 to go through the high-temperature heat exchanger 21, the heat medium mixer 53, and the temperature adjustment heat exchanger 45 functioning as the heater core, and return to the first pump 22. The low-temperature heat medium circuit 30 is configured to allow the heat medium from the second pump 32 to go through the low-temperature heat exchanger 31, the heat medium mixer 52, and the temperature adjustment heat exchanger 44 functioning as the cooler core, and return to the second pump 32.

In this example, the high-temperature heat medium without the low-temperature heat medium is fed to the temperature adjustment heat exchanger 47 for the individual air conditioning unit M6 via the heat medium mixer 54. Then, the heat medium having gone through the temperature adjustment heat exchanger 47 is branched at the branch D, and one of the branched heat mediums returns from the first connector C1 to the high-temperature heat medium circuit 20, and the other returns from the second connector C2 to the low-temperature heat medium circuit 30.

The temperature adjustment heat exchanger 41 for the battery M1, the temperature adjustment heat exchanger 42 for the inverter M2, and the temperature adjustment heat exchanger 43 for the motor M3 are connected to the air-cooling heat medium circuit 60 in parallel with each other, in the same way as the example illustrated in FIG. 4.

Figure 6:
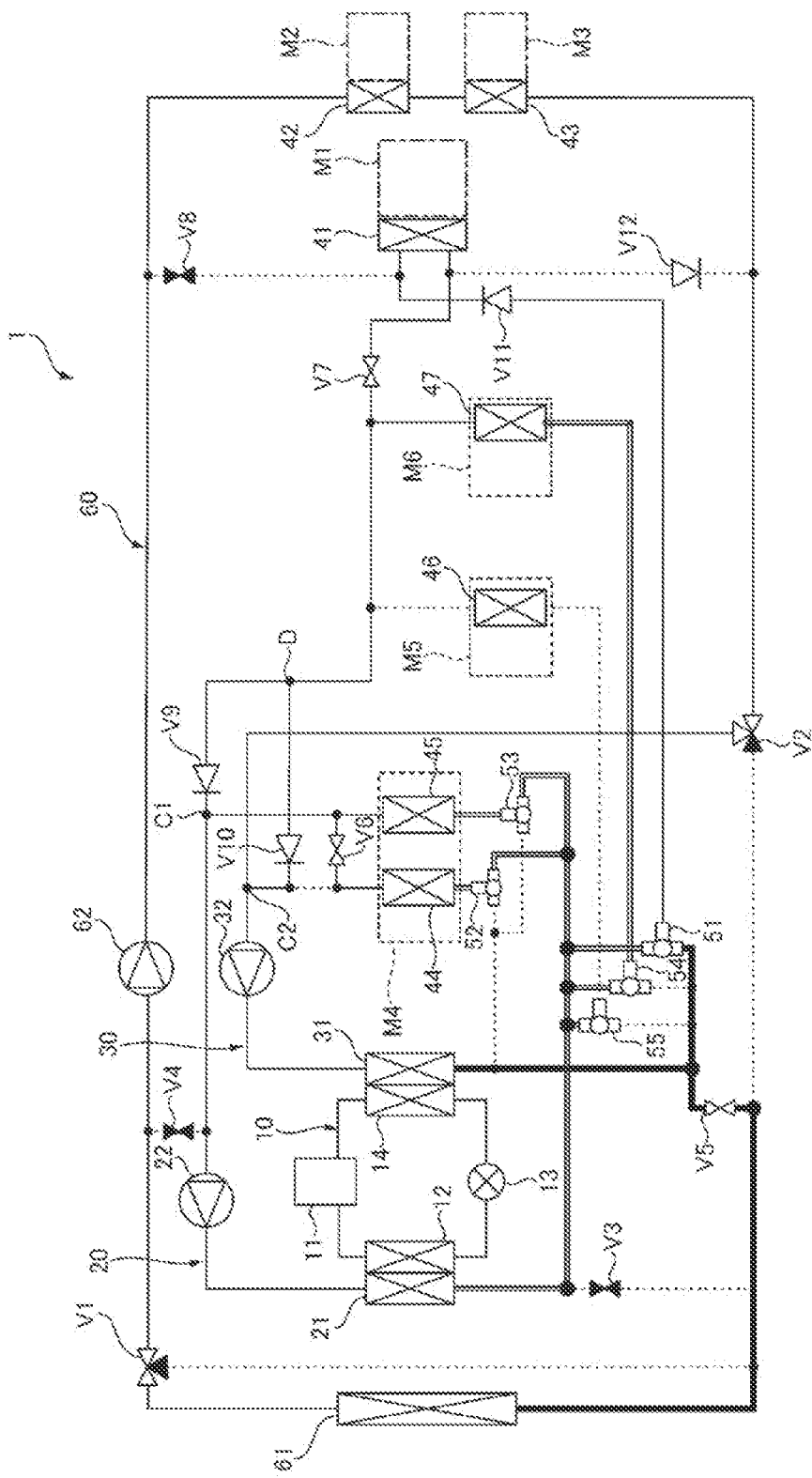
FIG. 6 illustrates an example of operation modes of the heat management system.

The circuit condition illustrated in FIG. 6 indicates an operation mode to perform the heating and warm up the battery.

In this case, both the temperature adjustment heat exchangers 44 and 45 for the main air conditioning unit M4 function as the heater cores. The high-temperature heat medium circuit 20 is configured to allow the heat medium from the first pump 22 to go through the high-temperature heat exchanger 21, the heat medium mixers 52 and 53, the temperature adjustment heat exchangers 44 and 45 functioning as the heater cores, and the valve V6, and return to the first pump 22.

On the other hand, the low-temperature heat medium circuit 30 is configured to allow the heat medium from the second pump 32 to go through the low-temperature heat exchanger 31, the valve V5, the air heat exchanger 61, the valve V1, the third pump 62, the temperature adjustment heat exchangers 42 and 43, and the valve V2, and return to the second pump 32. Here, the heat medium flowing through the low-temperature heat medium circuit 30 is heated with the exhaust heat from the inverter M2 and the motor M3 while passing through the temperature adjustment heat exchangers 42 and 43.

The heat medium adjusted to a high temperature is supplied from the heat medium mixer 51 to the temperature adjustment heat exchanger 41 for the battery M1, and the high-temperature heat medium without the low-temperature heat medium is supplied to the temperature adjustment heat exchanger 47 for the individual air conditioning unit M6 via the heat medium mixer 54.

Figure 7:
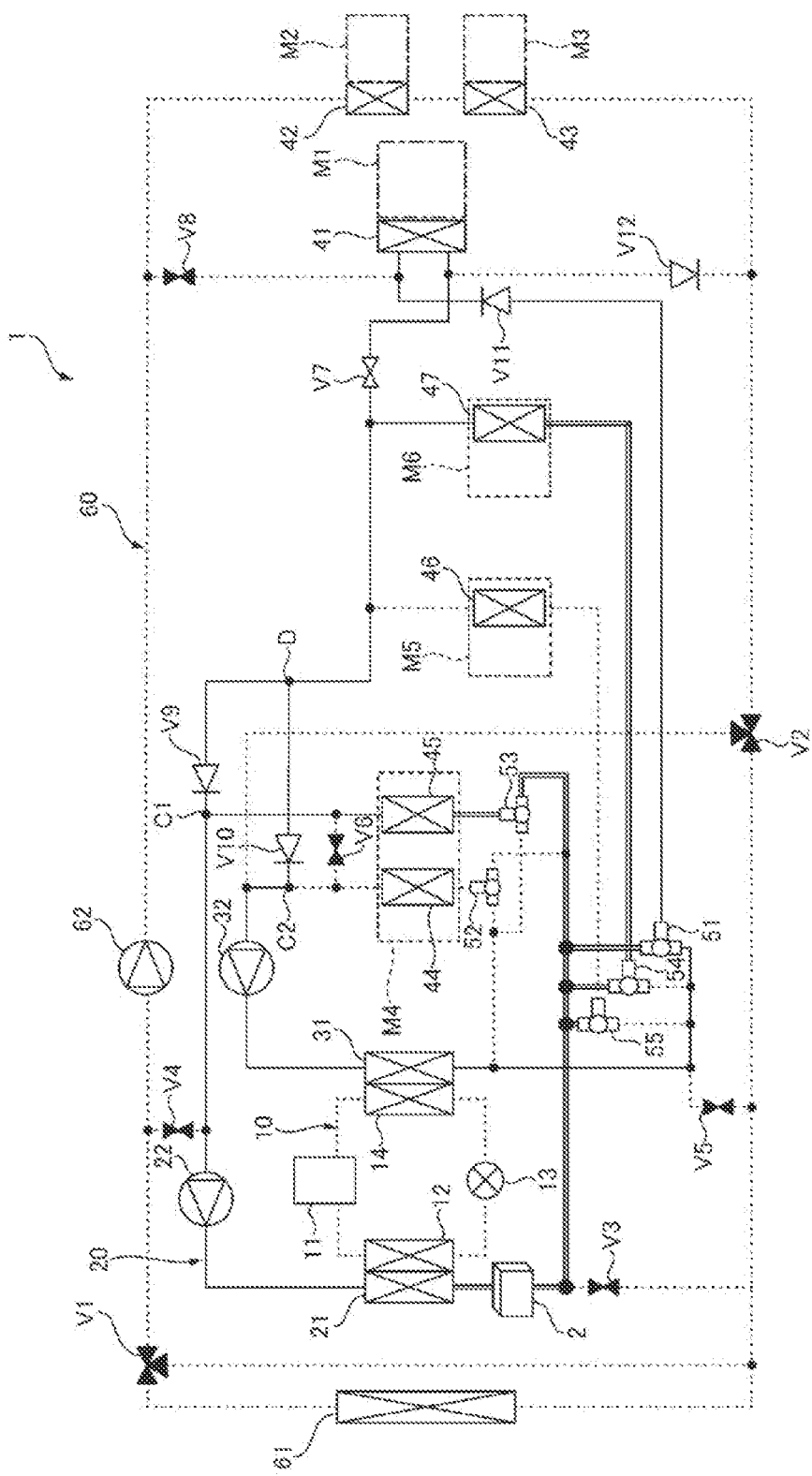
FIG. 7 illustrates an example of operation modes of the heat management system.

The circuit condition illustrated in FIG. 7 is an example for reference in which the electric heater 2 is added to the high-temperature heat medium circuit 20, and indicates an operation mode to perform the heating and warm up the battery. In this example, the operation of the refrigerant circuit 10 is stopped, and in the high-temperature heat medium circuit 20, the heat medium is heated to a high temperature only with the electric heater 2, and is fed to the temperature adjustment heat exchangers 41, 47 and 45.

As described above, according to the embodiment of the invention, it is possible to establish the heat management system with effective use of the heat release and the heat absorption of the heat pumps. By this means, it is possible to improve the energy use efficiency, reduce the power consumption, and adjust the temperature of the heat management subject in a desired temperature range.

Moreover, it is possible to adjust the temperature of the heat medium flowing through the heat exchanger for the main air conditioning unit M4 to an optimum temperature by mixing high-temperature water and low-temperature water without an air mix damper. Therefore, it is possible to reduce the number of components such as the main air conditioning unit M4, and consequently realize a compact unit.

As described above, the embodiments of the present invention have been described in detail with reference to the drawings. However, the specific configuration is not limited to these embodiments, and the design can be changed without departing from the scope of the present invention. In addition, the above-described embodiments can be combined by utilizing each other's technology as long as there is no particular contradiction or problem in the purpose and configuration.

REFERENCE SIGNS LIST

1: heat management system, 2: electric heater,
10: refrigerant circuit, 11: compressor, 12: condenser,
13: expansion valve, 14: evaporator,
20: high-temperature heat medium circuit,
21: high-temperature heat exchanger, 22: first pump
30: low-temperature heat medium circuit,
31: low-temperature heat exchanger, 32: second pump,
40 to 47: temperature adjustment heat exchanger,
50 to 55: heat medium mixer,
V1 to V12: valve,
60: air-cooling heat medium circuit, 61: air heat exchanger,
62: third pump,
D: branch, C1: first connector, C2: second connector,
M: heat management subject, M1: battery, M2: inverter, M3: motor,
M4: main air conditioning unit,
M5, M6: individual air conditioning unit

The invention claimed is:

1. A heat management system comprising:
a refrigerant circuit through which a refrigerant is circulated;
a high-temperature heat medium circuit through which heat medium pumped from a first pump is heated by heat released from the refrigerant, and circulated;
a low-temperature heat medium circuit through which heat medium pumped from a second pump is cooled by absorbing heat into the refrigerant, and circulated;
a temperature adjustment heat exchanger configured to adjust a temperature of a heat management subject;
a heat medium mixer connected to an upstream side of the temperature adjustment heat exchanger, and configured to mix high-temperature heat medium from the high-temperature heat medium circuit and low-temperature heat medium from the low-temperature heat medium circuit at a ratio depending on a target temperature of the heat management subject; and
a branching point provided at a downstream side of the temperature adjustment heat exchanger, and configured to return the heat medium from the temperature adjustment heat exchanger to the high-temperature heat medium circuit and the low-temperature heat medium circuit wherein:
a first part of the heat medium branched at the branching point is returned to the high-temperature heat medium circuit through a first connector upstream of the first pump;
a second part of the heat medium branched at the branching point is returned to the low-temperature heat medium circuit through a second connector upstream of the second pump; and
a check valve is provided in each of the flow paths between the branching point and the first connector and between the branching point and the second connector.

2. The heat management system according to claim 1, wherein the heat medium mixer is provided for each of a plurality of heat management subjects.

* * * * *